Figure 1:
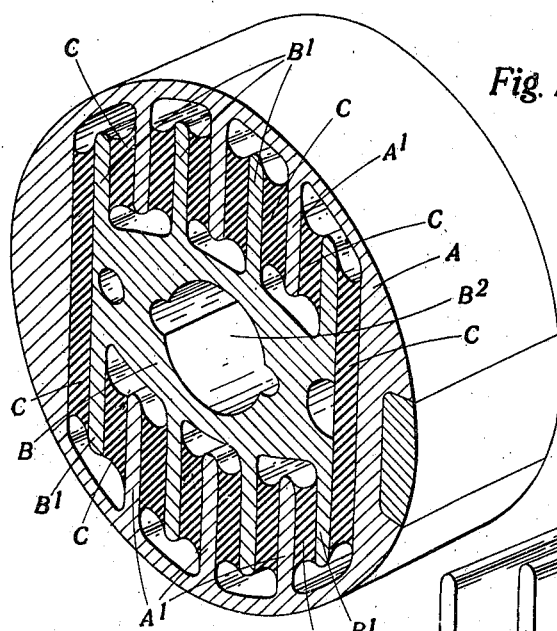

April 22, 1941.    F. B. HALFORD ET AL    2,239,319
FLEXIBLE SUPPORT
Filed Nov. 4, 1939    5 Sheets-Sheet 1

Inventor
F. B. HALFORD
C. F. VICKERS
by
Blair+Kilcoyne
Attorney

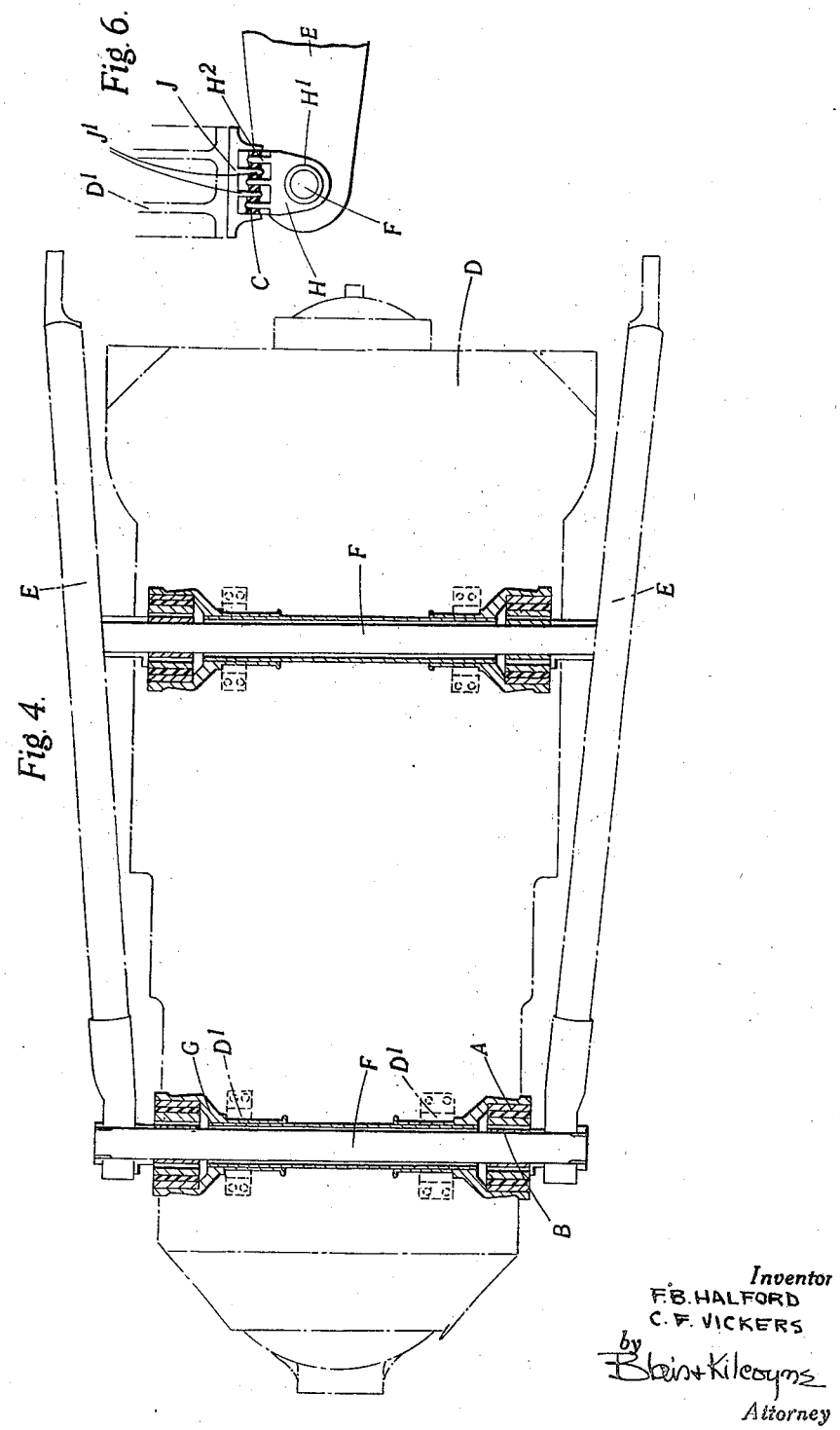

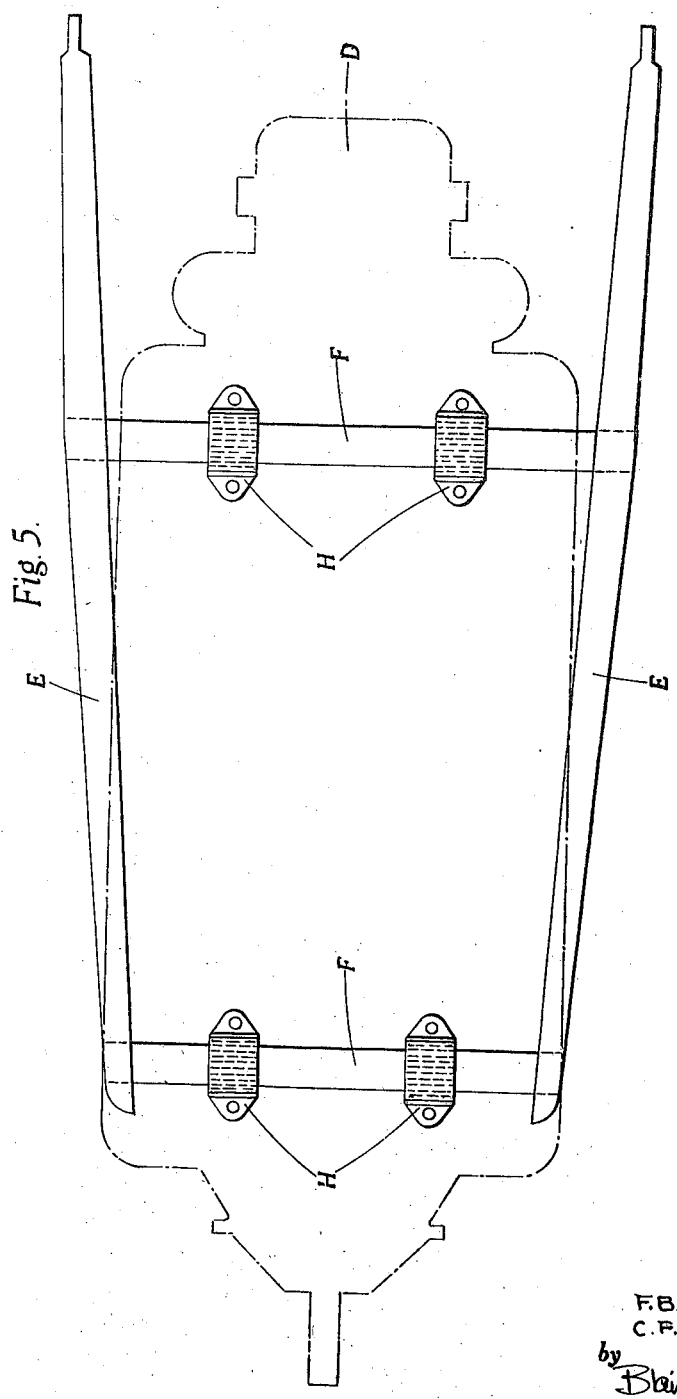

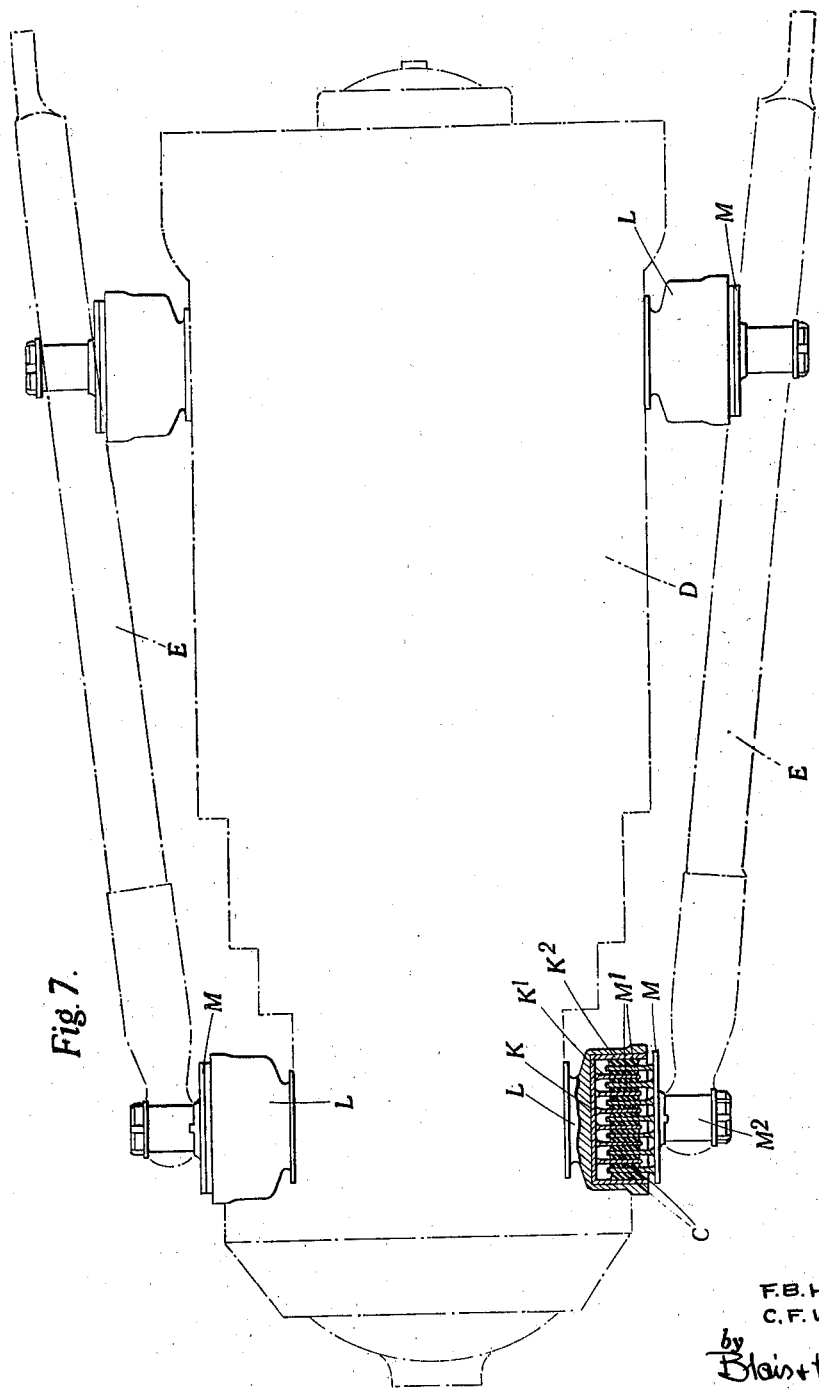

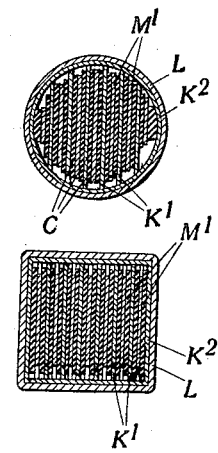
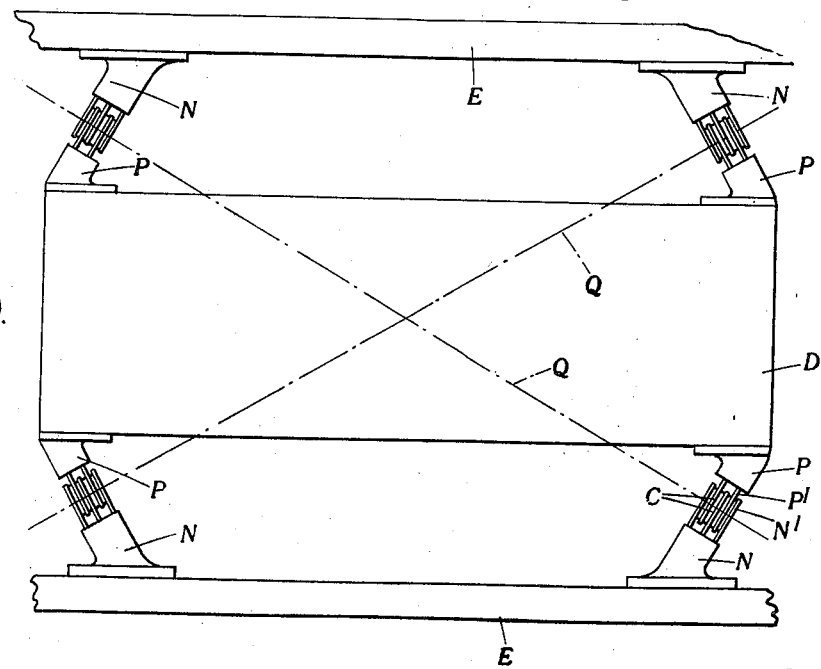

Patented Apr. 22, 1941

2,239,319

UNITED STATES PATENT OFFICE 2,239,319

FLEXIBLE SUPPORT

Frank Bernard Halford, Edgware, and Charles Frederick Vickers, London, England, assignors to D. Napier & Son Limited, London, England, a company of Great Britain Application November 4, 1939, Serial No. 302,936
In Great Britain November 5, 1938

13 Claims. (Cl. 248—9)

This invention relates to flexible supports for internal combustion engines or other apparatus and of the kind comprising two members connected together by rubber and adapted to be secured respectively to the apparatus to be supported and to the supporting structure.

In such flexible supports it is sometimes desirable to have a comparatively high degree of flexibility in one or more directions so as to allow for a correspondingly large relative movement in such direction or directions between the two members while having comparative rigidity or small flexibility in another direction and one object of the invention is to provide an improved flexible support of the kind referred to which will give different degrees of flexibility or rigidity in different directions as may be required.

Such supports may be employed, for example, to support internal combustion engines, for example aircraft engines, from supporting frames such as the supporting frames of the aeroplanes, and in such an arrangement it may be desirable to allow for a comparatively high degree of flexibility in a direction permitting vertical movement of the engine relatively to the frame while providing a high degree of resistance to longitudinal movement of the engine so that the engine can act as a cross-bracing member for the frame on which it is mounted.

For the sake of convenience the apparatus to be supported will be hereinafter referred to as the "engine" although it is to be understood that flexible supports according to the invention may be employed to support other types of apparatus.

According to one feature of the present invention a flexible mounting for connecting a structure to be supported to a supporting structure comprises two members adapted to be connected respectively to the said structures, whereof one member has a series of spaced parallel plates projecting from it and providing between them trough-like channels and the other member has spaced plates projecting from it into said channels, and in said channels pads of rubber bonded to both sides of the channel and to both faces of the plate projecting into it.

Preferably the plates are formed so that the channels have straight-line axes, for example the plates may be of rectangular form.

The invention also includes the combination with an internal combustion engine and a supporting frame of a flexible mounting as set forth in which the planes of the plates lie at a substantial angle to the longitudinal axis of the engine. For example the mountings may be arranged at the corners of a quadrilateral and the plates may be arranged in planes substantially perpendicular to the diagonals of the said quadrilateral.

Figure 2:
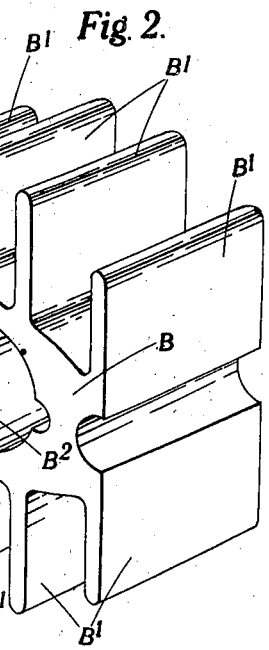
Figure 3:
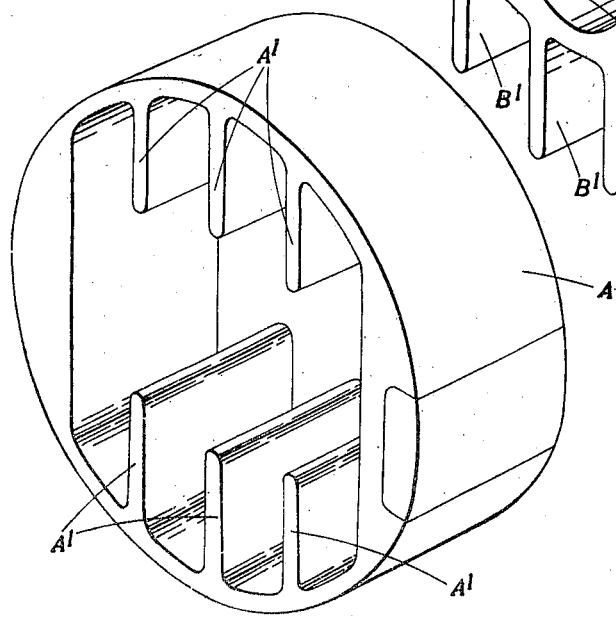

Further objects and features of the invention will be apparent from the following description of certain specific embodiments thereof with reference to the accompanying drawings, in which Figure 1 is a perspective sectional view of one form of mounting, Figures 2 and 3 are respectively perspective views of the inner and outer members of the mounting shown in Figure 1, Figure 4 is a diagrammatic sectional under plan of an engine supported by mountings of the form shown in Figures 1–3, Figure 5 is a view similar to Figure 4 showing a modified form of mounting, Figure 6 is a detail of Figure 5 shown in elevation, Figure 7 is a view similar to Figure 5 of a further modified arrangement, Figure 8 is a detail of Figure 7 shown in elevation, Figure 9 is a modification of Figure 8, and Figure 10 is a diagram showing a modified manner of arranging the mountings.

In the construction shown in Figures 1 to 3 the mounting comprises an outer member A of generally tubular form provided with a series of parallel rectangular plates $A^1$ projecting from its inner surface in planes parallel to its axis, and an inner member comprising a web B which extends in a generally diametral plane and from which project a series of parallel plates $B^1$ in planes perpendicular to the said diametral plane and parallel to the axis. The plates of each member afford between them a series of trough-like recesses into each of which a plate of the companion member extends. Strips or pads of rubber C are arranged between and bonded to adjacent surfaces of the plates and between the sides of the inner member and the adjacent parts of the outer member. The inner member is formed with a bore $B^2$ adapted to receive a rod, shaft or bolt which may constitute a part of the supporting structure or by which the inner member may be connected to the supporting structure, while the outer member has an external cylindrical surface coaxial with the bore $B^2$ and adapted to be secured within a housing fixed to the engine.

It will be seen that this construction provides a comparatively high degree of flexibility in a direction parallel to the planes in which the plates lie and at right angles to the axis of the outer member but comparative rigidity in a direction at right angles to the planes in which the plates lie.

Further, the degree of relative movement between the inner and outer members in a direction parallel to the planes in which the plates lie and at right angles to the axis of the outer member will be limited by the ends of the plates coming into contact with the bases of the trough-like channels in which they lie. Moreover, if desired, packing members such as metal strips may be inserted in the base of one or more of the trough-like channels to be engaged by the plate therein to limit relative movement. If desired, means may also be provided for limiting relative movement between the inner and outer members in a direction at right angles to the planes in which the plates lie while further in some cases end plates may be secured either to the inner or to the outer member adapted to make contact with the other member so as to limit or prevent relative movement between the inner and outer members in the direction of the axis of the bore $B^2$.

The inner and outer members may be formed by casting, forging or otherwise and in some cases may be built up of two or more parts.

Preferably the longitudinal axes of the plates on each member are parallel to one another so that each trough-like channel between two plates is of the same width throughout its length. In some cases, however, the longitudinal axes of the plates on each member may be somewhat inclined to one another so that the width of each trough-like channel varies from one end thereof to the other. This may be desirable, for example, where it is desired to provide reduced flexibility between the two members in a direction parallel to the length of the channels while maintaining a comparatively high degree of flexibility in a direction at right angles to the length of a recess and parallel to a plane lying midway between the sides of the recess.

Each plate may be of the same thickness from its base, where it is connected to the member supporting it, to its free edge so that the trough-like channels have parallel sides, or may taper somewhat from its base to its free edge so that each channel is somewhat narrower at its base than at the top.

In a modification of the construction described above having inner and outer members, the plates, instead of extending parallel to the length of the outer member may be inclined thereto so as to be, for example, either helical in form or lie in planes oblique to the axis. Such an arrangement will provide for greater resistance to relative movement between the members in a direction parallel to the length of the outer member.

Figure 4 shows the application of the mounting shown in Figures 1 to 3 to the support of an engine D in a frame comprising side members E and cross members in the form of hollow rods or tubes F. The inner member B of the flexible mounting is in each case mounted on the cross tube F which passes through the bore $B^2$ therein, whilst the outer member A is secured in a housing G carried by a foot $D^1$ on the underside of the engine.

In an alternative construction each member comprises a substantially flat base from the face of which the parallel plates project so as to constitute a rack-like structure. Thus, the tooth-like plates on one member lie between the tooth-like plates on the other member after the manner of the intermeshing teeth of gear wheels but with spaces between the teeth in which lie the strips or pads of rubber which are bonded to the plates.

Figures 5 and 6 show an arrangement employing such a form of mounting. In this case each mounting comprises a bracket H having a bore $H^1$ through which one of the cross members F of the frame passes, and a generally flat surface from which project a member of rectangular plates $H^2$. Each foot $D^1$ of the engine carries a flat bracket J from which project a number of parallel rectangular plates $J^1$ which intermesh with the plates $H^2$ with the interposition of rubber pads C bonded to both surfaces as in Figures 1 to 3.

Figures 7 and 8 show a further modification in which the flat base plates from the faces of which the plates project are arranged in a vertical plane. Thus one flat base member K having plates $K^1$ projecting from it has an annular peripheral flange $K^2$ mounted in a housing L bolted or otherwise secured to a foot or flat on the side of the engine. The companion base member M having plates $M^1$ projecting from one face has a stud $M^2$ projecting from the opposite face and secured by a nut in a bore in the side member E of the frame.

The cross-section of the mounting may be generally circular as indicated in Figure 8 or of square or rectangular form as indicated in Figure 9.

In the application of the mountings according to the invention to the support of an internal combustion engine, for example, from the frame of an aeroplane, the support may be disposed with the plates extending vertically and approximately at right angles to the length of the engine, as indicated in Figures 4, 5 and 7. It is thus possible to provide the desired flexibility permitting the engine to move in the vertical direction but considerably higher resistance to longitudinal movement of the engine. This enables the engine to act as a cross-bracing member between the two longitudinal frame members on which it is mounted.

In some cases it may be desirable to arrange the supports so that the plates in each support are approximately at right angles to the diagonal of the quadrilateral on which the mountings lie. Thus Figure 10 shows diagrammatically an arrangement in which members N with plates $N^1$ are secured to the side members E of the frame whilst members P with plates $P^1$ are secured to the engine, the planes of the plates being perpendicular to the diagonals Q of the rectangle at the corners of which the mountings lie. It will be appreciated that Figure 10 is purely diagrammatic and the constructional form of the mountings may for example be as indicated in one of Figures 1 to 9. It will be appreciated that the arrangements shown in the drawings may be combined or modified, for example the plates of the mountings at the front end may be perpendicular to the diagonals, as indicated in Figure 10, whilst those of the mounting at the back end may be perpendicular to the longitudinal axis of the engine, or vice versa.

It will be appreciated that by varying the direction in which the plates extend, the thickness of the rubber, the number of plates and the dimensions of the device, the degree of flexibility in different directions may be varied to suit requirements.

What we claim as our invention and desire to secure by Letters Patent is:

1. A flexible mounting for connecting a structure to be supported to a supporting structure comprising an outer and an inner member adapted to be connected respectively to the said structures, the inner member being arranged within a generally cylindrical recess in the surrounding outer member, wherein one member has a series of spaced parallel plates projecting from it and providing between them trough-like channels the length of which lies at a substantial angle to a plane normal to the axis of the members, and the other member has spaced plates projecting from it into said channels, and in the said channels pads of rubber bonded to both sides of the channel and to both faces of the plate projecting into it.

2. A flexible mounting for connecting a structure to be supported to a supporting structure, comprising two members adapted to be connected respectively to the said structures, the connection of one member to its structure being made through a connecting shaft whilst the other member comprises a surrounding housing, whereof one member has spaced parallel plates projecting from it and providing between them trough-like channels the length of which lies at a substantial angle to a plane normal to the axis of said shaft, and the other member has spaced plates projecting from it into said channels, and in said channels pads of rubber bonded to both sides of the channel and to both faces of the plate projecting into it.

3. A flexible mounting for connecting a structure to be supported to a supporting structure, comprising an inner and an outer member adapted to be connected respectively to the said structures, whereof the inner member is arranged within a generally cylindrical recess in the outer member and comprises a web extending generally in a diametral plane and plates projecting from both sides of it in planes perpendicular to the said diametral plane and lying at a substantial angle to a plane normal to the axis, and the outer member has spaced plates projecting inwardly from it into the said channels, and in said channels pads of rubber bonded to both sides of the channel and to both faces of the plate projecting into it.

4. A flexible mounting for connecting a structure to be supported to a supporting structure, comprising an inner and an outer member adapted to be connected respectively to the said structures, whereof the inner member is formed with a bore to receive a connecting shaft and is arranged within a recess in the surrounding member and has a series of spaced parallel plates projecting from it in planes lying at a substantial angle to a plane normal to the axis of said bore and providing between them trough-like channels, and the outer member has spaced plates projecting from the interior of its recess into said channels, and in said channels pads of rubber bonded to both sides of the channel and to both faces of the plate projecting into it.

5. A flexible mounting for connecting a structure to be supported to a supporting structure, comprising an inner and an outer member adapted to be connected respectively to the said structures, whereof the inner member is arranged within a generally cylindrical recess in the outer member and comprises a web extending generally in a diametral plane normal to the axis and having an axial bore to receive a connecting shaft, the part of said web remote from the axis being narrower than that in the neighbourhood of the axis, and a series of spaced parallel plates projecting from said web in planes which lie at a substantial angle to a plane normal to the axis, and the outer member has spaced plates projecting inwardly from it into the said channels, and in said channels pads of rubber bonded to both sides of the channel and to both faces of the plate projecting into it.

6. The combination with an internal combustion engine and a supporting frame therefor, of flexible mountings connecting the engine to the frame and situated at the corners of a quadrilateral and each comprising two members, connected respectively to the engine and the frame, whereof one member has a series of spaced parallel plates projecting from it in planes substantially perpendicular to the diagonals of the said quadrilateral and providing between them trough-like channels, and the other member has spaced plates projecting from it into said channels, and in said channels pads of rubber bonded to both sides of the channel and to both faces of the plate projecting into it.

7. The combination with a generally horizontal supporting frame comprising side members and cross members, of an internal combustion engine supported thereon by means of four flexible mountings situated at the corners of a quadrilateral, each mounting comprising two members connected respectively to the frame and engine whereof one member has a series of spaced parallel plates projecting from it and providing between them trough-like channels and the other member has spaced plates projecting from it into said channels, and in each channel pads of rubber or other resilient material bonded to both sides of the channel and both faces of the plate projecting into it, the plates being approximately vertical and inclined at a substantial angle to the diagonal of the quadrilateral.

8. The combination with a generally horizontal supporting frame comprising side members and cross members, of an internal combustion engine supported thereon by means of four flexible mountings situated at the corners of a quadrilateral, each mounting comprising two members connected respectively to the frame and engine whereof one member has a series of spaced parallel plates projecting from it and providing between them trough-like channels having rectilinear axes and the other member has spaced plates projecting from it into said channels, and in each channel pads of rubber or other resilient material bonded to both sides of the channel and both faces of the plate projecting into it, the plates being approximately vertical and inclined at a substantial angle to the diagonal of the quadrilateral.

9. The combination with a generally horizontal supporting frame comprising side members and cross members, of an internal combustion engine supported thereon by means of four flexible mountings situated at the corners of a quadrilateral, each mounting comprising two members connected respectively to the frame and engine, whereof one member has a series of spaced parallel plates of rectangular shape projecting from it and providing between them trough-like channels, and the other member has spaced plates projecting from it into said channels, and in each channel pads of rubber or other resilient material bonded to both sides of the channel and both faces of the plate projecting into it, the plates being approximately vertical and inclined at a substantial angle to the diagonal of the quadrilateral.

10. The combination with a generally horizontal supporting frame comprising side members and cross members, of an internal combustion engine supported thereon by means of four flexible mountings situated at the corners of a quadrilateral, each mounting comprising two members connected respectively to the frame and engine, whereof one member has in it a generally cylindrical recess and a series of spaced parallel plates projecting from the inner walls of said recess in planes parallel to the axis of the recess and providing between them trough-like channels, and the other member has spaced plates projecting from it into said channels, and in each channel pads of rubber or other resilient material bonded to both sides of the channel and both faces of the plate projecting into it, the plates being approximately vertical and inclined at a substantial angle to the diagonal of the quadrilateral.

11. The combination with a generally horizontal supporting frame comprising side members and cross members, of an internal combustion engine supported thereon by means of four flexible mountings situated at the corners of a quadrilateral, each mounting comprising two members connected respectively to the frame and engine, whereof one member has in it a generally cylindrical recess and a series of spaced parallel plates projecting from the inner walls of said recess in planes parallel to the axis of the recess and providing between them trough-like channels, and the other member is situated within the said recess and comprises a web extending generally in a diametral plane and spaced plates projecting from both sides of it into said channels in planes perpendicular to the said diametral plane and parallel to the axis, and in each channel pads of rubber or other resilient material bonded to both sides of the channel and both faces of the plate projecting into it, the plates being approximately vertical and inclined at a substantial angle to the diagonal of the quadrilateral.

12. The combination with a generally horizontal supporting frame comprising side members and cross members, of an internal combustion engine supported thereon by means of four flexible mountings situated at the corners of a quadrilateral, each mounting comprising two members connected respectively to the frame and engine, whereof one member has in it a generally cylindrical recess and a series of spaced parallel plates projecting from the inner walls of said recess in planes parallel to the axis of the recess and providing between them trough-like channels, and the other member is situated within the said recess and comprises a web of which the part remote from the axis is thinner than that near the axis and which extends generally in a diametral plane and spaced plates projecting from both sides of it into said channels in planes perpendicular to the said diametral plane and parallel to the axis, and in each channel pads of rubber or other resilient material bonded to both sides of the channel and both faces of the plate projecting into it, the plates being approximately vertical and inclined at a substantial angle to the diagonal of the quadrilateral.

13. The combination with a generally horizontal supporting frame comprising side members and cross members, of an internal combustion engine supported thereon by means of four flexible mountings situated at the corners of a quadrilateral, each mounting comprising two members connected respectively to the frame and engine, whereof one member has in it a generally cylindrical recess and a series of spaced parallel plates projecting from the inner walls of said recess in planes parallel to the axis of the recess and providing between them trough-like channels, and the other member is situated within the aforesaid recess and comprises a web extending generally in a diametral plane and spaced plates projecting from both sides of it in planes perpendicular to the said diametral plane and parallel to the axis, and is formed with an axial bore by which it is mounted on one of the cross members of the frame, and in each channel pads of rubber or other resilient material bonded to both sides of the channel and both faces of the plate projecting into it, the plates being approximately vertical and inclined at a substantial angle to the diagonal of the quadrilateral.

FRANK BERNARD HALFORD.
CHARLES FREDERICK VICKERS.